(12) United States Patent
Yagi et al.

(10) Patent No.: US 10,066,490 B2
(45) Date of Patent: Sep. 4, 2018

(54) FAN ROTOR BLADE OF AIRCRAFT JET ENGINE

(71) Applicant: IHI Corporation, Koto-ku (JP)

(72) Inventors: Hiroyuki Yagi, Tokyo (JP); Hiroshi Kuroki, Tokyo (JP); Kenro Obuchi, Tokyo (JP)

(73) Assignee: IHI Corporation, Koto-ku (JP)

( * ) Notice: Subject to any disclaimer, the term of this patent is extended or adjusted under 35 U.S.C. 154(b) by 416 days.

(21) Appl. No.: 14/444,541

(22) Filed: Jul. 28, 2014

(65) Prior Publication Data

US 2015/0104324 A1    Apr. 16, 2015

Related U.S. Application Data

(63) Continuation of application No. PCT/JP2013/051968, filed on Jan. 30, 2013.

(30) Foreign Application Priority Data

Jan. 30, 2012 (JP) ................................. 2012-017133

(51) Int. Cl.
*F01D 9/04* (2006.01)
*F01D 5/28* (2006.01)
(Continued)

(52) U.S. Cl.
CPC ............. *F01D 5/282* (2013.01); *F01D 5/147* (2013.01); *F04D 29/023* (2013.01);
(Continued)

(58) Field of Classification Search
CPC ........ F01D 5/282; F01D 5/147; F04D 29/234; F04D 29/325; F04D 29/388; F05D 2240/303
See application file for complete search history.

(56) References Cited

U.S. PATENT DOCUMENTS 3,602,608 A     8/1971  Morley
3,892,612 A *   7/1975  Carlson ................... F01D 5/282
                                                        156/150
(Continued)

FOREIGN PATENT DOCUMENTS

CN    101153612 A    4/2008
EP    2 256 296 A2   12/2010
(Continued)

OTHER PUBLICATIONS

Office Action dated Sep. 30, 2015 in Russian Patent Application No. 2014135149/06(056908) (with English language translation).
(Continued)

*Primary Examiner* — Ninh H Nguyen
(74) *Attorney, Agent, or Firm* — Oblon, McClelland, Maier & Neustadt, L.L.P.

(57) ABSTRACT

A fan rotor blade includes a blade body made from a composite material of a resin and fibers, and having a pressure surface and a suction surface. A dovetail capable of being fitted into a fitting groove in a fan disk is provided in a base end of the blade body. The blade body is provided with a sheath. The sheath is more rigid than the blade body and is fixed to the blade body in a state where the sheath covers a leading edge portion of the blade body and the vicinity thereof. The sheath extends in the longitudinal direction of the blade body from a blade root side to a tip end side of the blade body, and a base end portion of the sheath located on the blade root side of the blade body extends to the dovetail.

10 Claims, 6 Drawing Sheets

(51) Int. Cl.
   *F04D 29/38* (2006.01)
   *F04D 29/32* (2006.01)
   *F04D 29/02* (2006.01)
   *F01D 5/14* (2006.01)
(52) U.S. Cl.
   CPC ......... *F04D 29/324* (2013.01); *F04D 29/325* (2013.01); *F04D 29/388* (2013.01); *F05D 2220/36* (2013.01); *F05D 2240/303* (2013.01); *F05D 2300/10* (2013.01); *F05D 2300/43* (2013.01); *F05D 2300/603* (2013.01); *Y02T 50/672* (2013.01)

(56) References Cited

U.S. PATENT DOCUMENTS

| | | | | |
|---|---|---|---|---|
| 4,451,205 | A * | 5/1984 | Honda | F01D 5/22 416/193 A |
| 4,621,979 | A * | 11/1986 | Zipps | F01D 5/141 416/190 |
| 5,141,400 | A * | 8/1992 | Murphy | B29C 43/18 416/204 A |
| 5,141,401 | A * | 8/1992 | Juenger | F01D 5/3007 416/219 R |
| 5,443,367 | A * | 8/1995 | Samit | F01D 5/147 416/223 A |
| 5,785,498 | A | 7/1998 | Quinn et al. | |
| 7,780,410 | B2 * | 8/2010 | Kray | B23P 15/04 415/9 |
| 8,186,961 | B2 * | 5/2012 | Stone | F01D 5/3092 416/221 |
| 8,376,712 | B2 * | 2/2013 | Klinetob | F01D 5/147 416/224 |
| 8,851,855 | B2 * | 10/2014 | James | F01D 5/282 416/224 |
| 8,871,297 | B2 * | 10/2014 | Barnett | B22F 1/0018 427/142 |
| 2003/0129061 | A1 | 7/2003 | Finn et al. | |
| 2005/0254953 | A1 * | 11/2005 | Stone | F01D 5/3007 416/219 R |
| 2008/0075601 | A1 * | 3/2008 | Giusti | F01D 5/147 416/229 A |
| 2008/0187441 | A1 * | 8/2008 | Schreiber | B29C 70/202 416/229 R |

FOREIGN PATENT DOCUMENTS

| | | |
|---|---|---|
| EP | 2 348 192 A2 | 7/2011 |
| EP | 2 405 101 A2 | 1/2012 |
| GB | 1 260 484 A | 1/1972 |
| GB | 1268202 A | 3/1972 |
| JP | 47-5009 B1 | 2/1972 |
| JP | 08-210102 A | 8/1996 |
| JP | 2008-088976 A | 4/2008 |
| JP | 2012-013017 A | 1/2012 |
| RU | 2 297 538 C2 | 4/2007 |

OTHER PUBLICATIONS

Office Action dated Feb. 10, 2016 in Russian Patent Application No. 2014135149/06(056908).
Office Action dated Jun. 1, 2016 in Russian Patent Application No. 2014135149/06(056908).
Extended European Search Report dated Sep. 9, 2015 in Patent Application No. 13742850.4.
U.S. Appl. No. 14/444,585, filed Jul. 28, 2014, Yagi, et al.
International Search Report dated May 7, 2013 for PCT/JP2013/051968 Filed on Jan. 30, 2013 (English Translation).
International Written Opinion dated May 7, 2013 for PCT/JP2013/051968 Filed on Jan. 30, 2013.
Combined Office Action and Search Report dated Aug. 25, 2015 in Patent Application No. 201380006670.8 (with English language translation).

* cited by examiner

FAN ROTOR BLADE OF AIRCRAFT JET ENGINE

CROSS REFERENCE TO RELATED APPLICATIONS

This application is a continuation application of International Application No. PCT/JP2013/051968, filed on Jan. 30, 2013, which claims priority to Japanese Patent Application No. 2012-017133, filed on Jan. 30, 2012, the entire contents of which are incorporated by references herein.

BACKGROUND OF THE INVENTION

1. Field of the Invention

The present invention relates to a fan rotor blade of an aircraft jet engine which is configured to take external air into an engine case by rotating integrally with a fan disk.

2. Description of the Related Art

As light-weight and high-strength materials, composite materials (FRP: fiber reinforced plastics) formed from a resin (thermosetting resin or thermoplastic resin) and fibers have attracted attention in the field of aircraft jet engines in recent years. A wide variety of fan rotor blades using such composite materials have been developed and come into practical use.

Meanwhile, a foreign object such as a bird and ice entering an engine case may collide with fans placed in the forefront of an aircraft jet engine. In preparation for such a collision of a foreign object, fan rotor blades made from the composite materials are equipped with measures to secure sufficient impact resistance.

In a fan rotor blade disclosed in Japanese Patent Application Laid-Open Publication No. 08-210102 (PTL 1), a blade body is formed from a composite material, and a metal sheath is provided at a portion on a leading edge side as well as a tip end side of a blade body which is most prone to a collision of a foreign object. Here, the metal sheath has higher strength than that of the composite material. Thus, PTL1 aims at a reduction in the overall weight of the fan rotor blade, and concurrently a reduction in damage caused by the collision of the foreign object by forming the blade body from the composite material, and providing the part of the blade body with the metal sheath.

SUMMARY OF THE INVENTION

Once a foreign object collides with the fan rotor blade, bending deformation is usually transmitted from the leading edge side to a trailing edge side of the blade body, and concurrently, the bending deformation is transmitted from the tip end side to a base end side of the blade body. In particular, such bending deformation occurs more significantly on the tip end side being a free end side of the blade body. At this time, in the fan rotor blade shown in PTL 1 describe above, bending stress caused by the collision of the foreign object works as force which tears the metal sheath off the blade body. As a result, once the foreign object collides with the fan rotor blade, it is more likely that: the sheath is torn off the blade body in a way that the sheath is rolled up from a seam between the sheath and the blade body; and the sheath detached from the blade body causes damage to other fan rotor blades, the engine case and the like. Given the circumstances, there has been a demand for further improvement in impact resistance of the fan rotor blades using the composite materials.

An object of the present invention is to provide a fan rotor blade of an aircraft jet engine which can achieve a reduction in its overall weight and a further improvement in impact resistance.

An aspect of the present invention is a fan rotor blade for an aircraft jet engine configured to be fitted in a fitting groove formed in a fan disk, and to take external air into a passage formed in an engine case by rotating integrally with the fan disk. The fan rotor blade includes: a blade body made from a composite material of a resin and fibers, and including a pressure surface facing one side in a rotation direction and a suction surface facing the other side in the rotation direction; a fitting portion provided on one end side of the blade body in a longitudinal direction thereof, and fitted into the fitting groove in the fan disk; and a sheath being more rigid than the blade body, and fixed to the blade body in a state where the sheath covers a leading edge portion of the blade body and the vicinity thereof, the leading edge portion being located on an upstream side in a direction of intake of the external air; wherein the sheath extends in the longitudinal direction of the blade body from the one end side to the other end side of the blade body in the longitudinal direction, and a base end portion of the sheath, which is one end of the sheath in the longitudinal direction, is located closer to the one end side of the blade body than the passage formed in the engine case.

The base end portion of the sheath may extend to the fitting portion of the blade body, and cover part of the fitting portion.

The base end portion of the sheath may be fitted into the fitting groove in the fan disk together with the blade body.

The sheath may be made from a metal material.

According to the present invention, it is possible to achieve an overall weight reduction and a further improvement in impact resistance.

DESCRIPTION OF THE PREFERRED EMBODIMENTS

Referring the accompanying drawings, detailed descriptions will be hereinbelow provided for a preferred embodiment of the present invention. Dimensions, materials, concrete numerical values and the like shown in the embodiment are mere examples for facilitating the understanding of the invention, and do not limit the present invention unless otherwise indicated. It should be noted that: throughout the description and drawings, components having virtually the same functions and configurations will be denoted by the same reference signs, and thereby, duplicated descriptions of such components will be omitted; and illustration of components not directly related to the present invention will be omitted.

Figure 1:
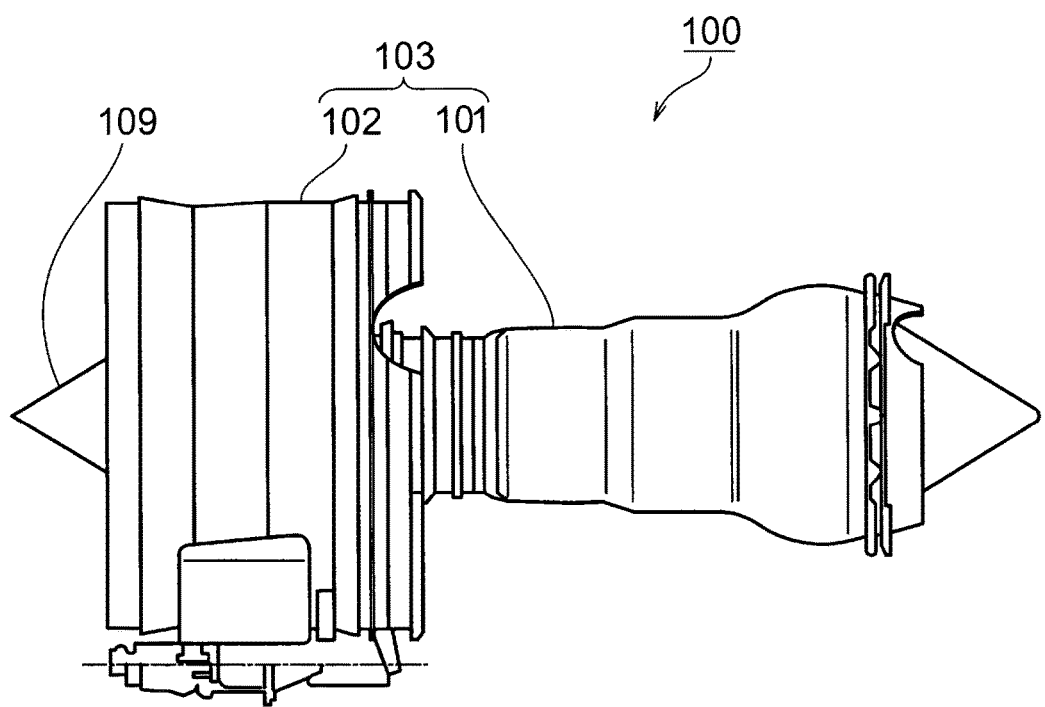
FIG. 1 is a side view of an aircraft jet engine including a fan rotor blade of an embodiment.
Figure 2:
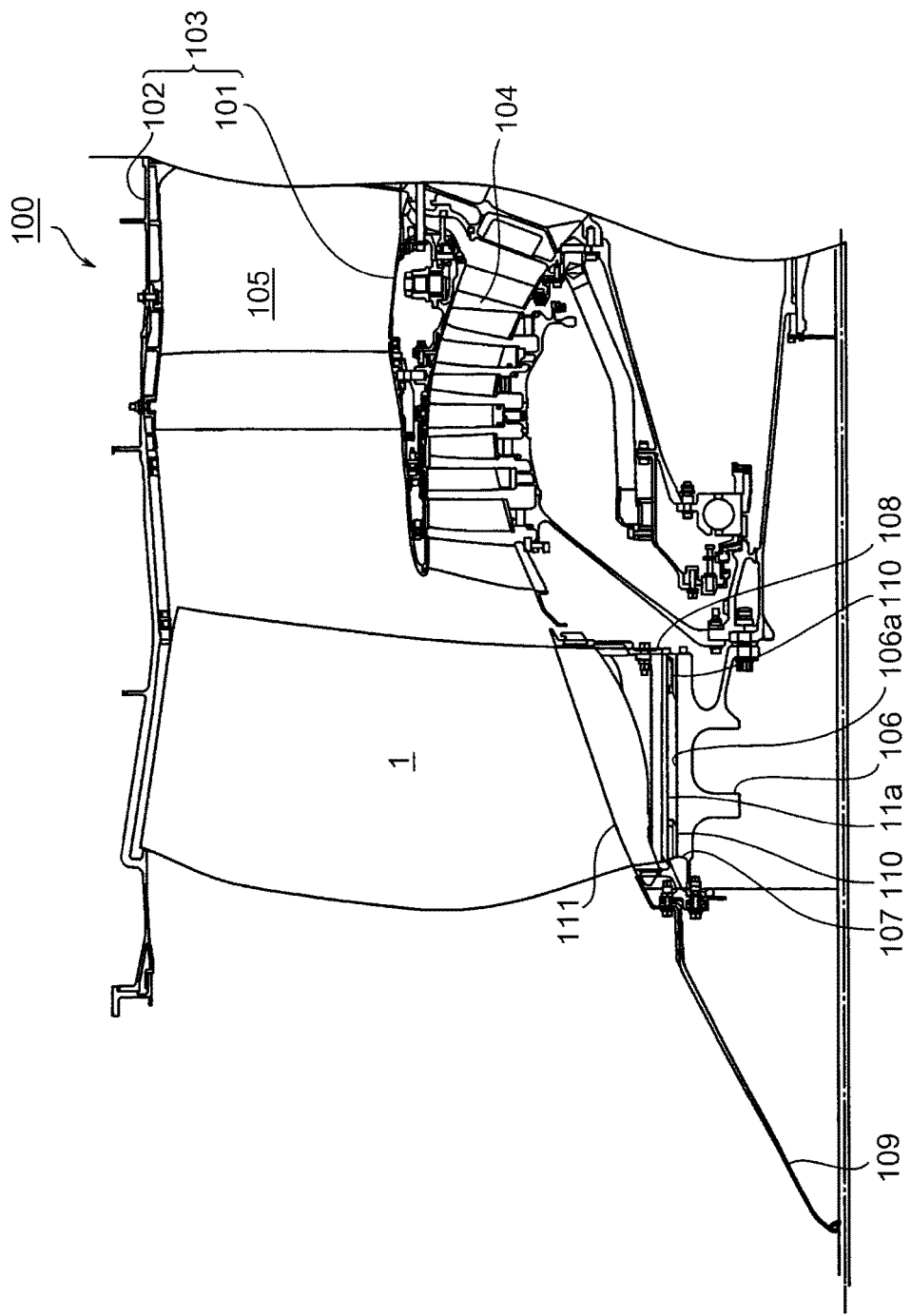
FIG. 2 is a partial cross-sectional view of FIG. 1.

FIG. 1 is a side view of an aircraft jet engine including a fan rotor blade of the embodiment, and FIG. 2 is a partial cross-sectional view of FIG. 1. As shown in FIGS. 1 and 2, a jet engine 100 includes an engine case 103 formed from: a cylindrical core cowl 101; and a cylindrical nacelle 102 provided around the outer periphery of the core cowl 101. The nacelle 102 houses multiple fan rotor blades 1 (only one of which is shown in FIG. 2) configured to suck external air into the engine case 103. When the fan rotor blades 1 rotate, the external air is guided into: a core passage 104 provided inside the core cowl 101; and a bypass passage 105 formed by the outer peripheral surface of the core cowl 101 and the inner peripheral surface of the nacelle 102.

Although detailed descriptions are omitted, a compressor configured to compress the suction air sucked by the fan rotor blades 1, a combustion chamber configured to combust the compressed air compressed by the compressor, and high- and low-pressure turbines configured to convert jetting power of exhaust jet produced in the combustion process in the combustion chamber into rotational energy are provided inside the core cowl 101. Upstream of the core cowl 101 in an intake direction of the external air (on the left side of the drawing), a fan disk 106 is rotatably housed in the nacelle 102. The fan disk 106 is connected to a rotor of the low-pressure turbine by use of a shaft, and thereby rotates integrally with the low-pressure turbine.

Multiple fitting grooves 106a configured to allow fitting of the fan rotor blades 1 and support the fan rotor blades 1 are formed in the outer peripheral surface of the fan disk 106 at equal intervals in the rotation direction (the circumferential direction). Although detailed descriptions will be described later, a dovetail 11a is formed in one end of each fan rotor blade 1 in its longitudinal direction (an end portion on the side of the fan disk 106). Each fitting groove 106a has an opening whose dimensions and shape enable the corresponding dovetail 11a to be housed in the fitting groove 106a, and which is capable of stopping the dovetail 11a from coming off in the radial direction of the fan disk 106 (in the longitudinal direction of the fan rotor blade 1).

For this reason, once the dovetail 11a is slid and fitted into the fitting groove 106a from the front or rear side of the fan disk 106 (in the leftward or rightward direction in FIG. 2), the fan rotor blade 1 comes to be held by the fan disk 106. Furthermore, an annular front retainer 107 is provided in front of the fan disk 106 (on the left side in FIG. 2), while an annular rear retainer 108 is provided in the rear of the fan disk 106 (on the right side in FIG. 2).

The front retainer 107 is integrally provided to a nose cone 109 configured to guide the external air into the engine case 103, while the rear retainer 108 is fixed to the fan disk 106. The fan rotor blades 1 are held in the respective fitting grooves 106a by the front retainer 107 and the rear retainer 108. It should be noted that: a spacer 110 is interposed between the bottom surface of each fitting groove 106a and the corresponding fan rotor blade 1; and the spacer 110 avoids backlash of the fan rotor blade 1 in a space formed between the fan rotor blade 1 and the fitting groove 106a.

Once the fan disk 106 rotates, the foregoing configuration makes the fan rotor blades 1 rotate integrally with the fan disk 106, and thereby takes the external air into the engine case 103. Inside the engine case 103 (the nacelle 102), a passage surface 111 configured to guide the thus-sucked external air is formed on the outer portion of the fan disk 106 in the radial direction. The external air guided by the passage surface 111 is guided to the core passage 104 and the bypass passage 105. Referring to FIGS. 3 to 6, detailed descriptions will be hereinbelow provided for a concrete configuration of the fan rotor blade 1.

Figure 3:
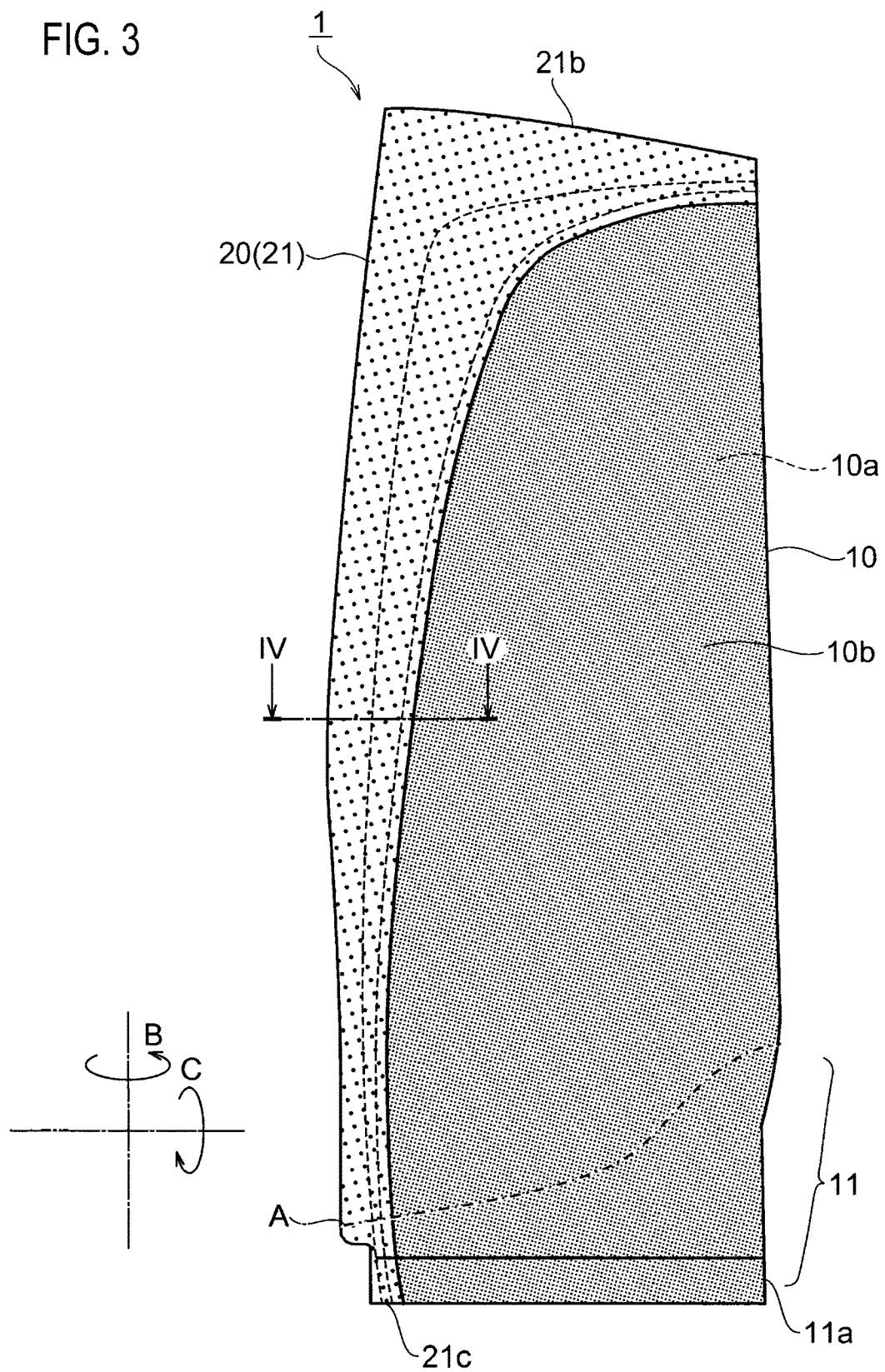
FIG. 3 is a perspective view of the fan rotor blade.
Figure 4:
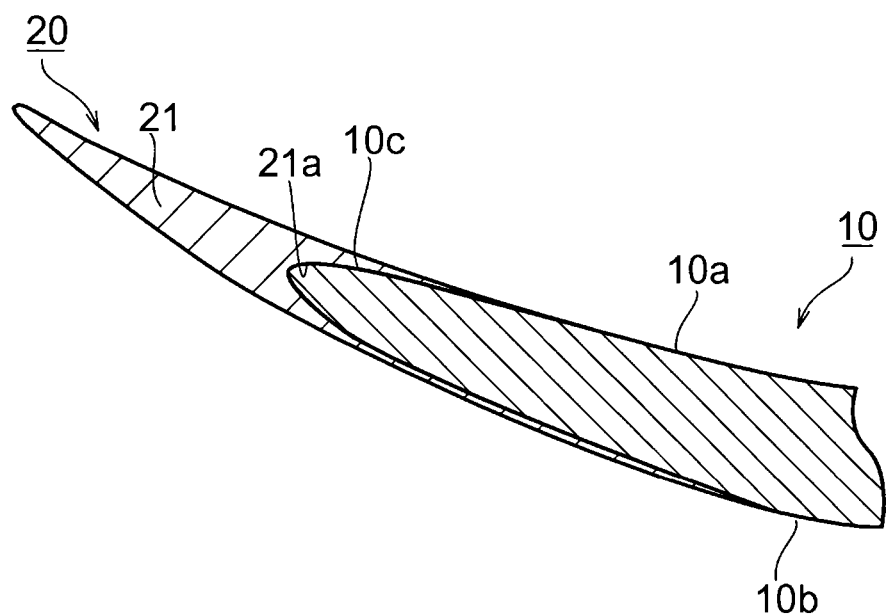
FIG. 4 is a cross-sectional view taken along the IV-IV line of FIG. 3.

FIG. 3 is a perspective view of the fan rotor blade 1, and FIG. 4 is a cross-sectional view taken along the IV-IV line of FIG. 3. The following descriptions will be provided for the fan rotor blade 1 fitted into the fan disk 106 by defining: a one end side of the fan rotor blade 1 in the longitudinal direction (on the side of the rotation center of the fan disk 106, on the lower side in FIG. 3) as a base end side; an opposite end side of the fan rotor blade 1 in the longitudinal direction (on the upper side in FIG. 3) as a tip end side; an upstream side of the fan rotor blade 1 in the intake direction of the external air (on the left side in FIG. 3) as a leading edge side; and a downstream side of the fan rotor blade 1 in the intake direction of the external air (on the right side in FIG. 3) as a trailing edge side.

The fan rotor blade 1 includes a blade body 10 made from a composite material of a resin and fibers. Examples of the resin constituting part of the composite material include: thermosetting resins such as epoxy resin, phenol resin and polyimide resin; and thermoplastic resins such as polyetherimide, polyetheretherketone and polyphenylene sulfide. Meanwhile, examples of the fibers constituting the other part of the composite material include fibers such as carbon fibers, aramid fibers and glass fibers. Nevertheless, as long as the strength required for the blade body 10 can be secured, concrete ingredients of the composite material are not limited to the above-mentioned examples.

The blade body 10 includes: a pressure surface 10a facing one side in the rotation direction when the blade body 10 fitted into the fan disk 106 rotates; and a suction surface 10b facing the other side in the rotation direction, and located opposite from the pressure surface 10a in the thickness direction of the blade body 10. Furthermore, as shown in FIG. 3, a blade root 11 constituting part of the blade body 10 is provided on the base end side of the blade body 10. The blade root 11 is fittable into the fitting groove 106a in the fan disk 106, and includes the dovetail 11a (a fitting portion) formed thicker than the remaining region of the blade body 10.

It should be noted that a dot-and-dash line A shown in FIG. 3 indicates a boundary portion between the blade root 11 and the rest of the blade body 10. To put it concretely, each of the pressure surface 10a and the suction surface 10b of the blade body 10 is provided with a platform (a collar constituting a passage) constituting the corresponding passage surface 111 (see FIG. 2) and made from a different material. In the embodiment, the part of the blade body 10 indicated with the dot-and-dash line A corresponds to the passage surface 111. In this case, the blade root 11 is part of the blade body 10 which is located closer to the rotation center of the fan disk 106 than the passage surface 111 is, that is to say, part of the blade body 10 which is located closer to the base end than the dot-and-dash line A is.

In addition, as shown in FIG. 4, a bond portion 10c which becomes gradually narrower toward the leading edge is formed in and around the leading edge-side end portions of the pressure surface 10a and the suction surface 10b of the blade body 10. A sheath 20 is fixed to the bond portion 10c. The sheath 20 is intended to enhance the impact resistance of the blade body 10 against the collision of foreign object such as birds and ice. The sheath 20 includes a sheath body 21 made from metal such as titanium and nickel. It should be noted that: the material of the sheath body 21 is not limited to the metal; and the sheath body 21 may be made from any other material as long as the material is more rigid than the blade body 10.

The sheath body 21 extends from the base end side to the tip end side of the blade body 10 in the longitudinal direction of the blade body 10, and is formed in a shape covering the leading edge portion of the blade body 10. To put it more concretely, the sheath body 21 includes a recessed close contact portion 21a which comes into close contact with the bond portion 10c, and is fixed to the blade body 10 with the close contact portion 21a in close contact with the bond portion 10c. It should be noted that an adhesive is applied or attached to a space between the close contact portion 21a of the sheath body 21 and the bond portion 10c of the blade body 10; and the sheath body 21 is fixed to the blade body 10 by use of this adhesive. In addition, when the sheath body 21 is fixed to the blade body 10, the sheath body 21 maintains a dimensional relationship in which the sheath body 21 is flush with the pressure surface 10a and the suction surface 10b of the blade body 10, and secures smooth continuity from the leading edge side to the trailing edge side of the fan rotor blade 1.

Furthermore, the bond portion 10c formed in the blade body 10 is continuously formed across the whole area of the blade body 10 from the base end to the tip end in the longitudinal direction. Accordingly, the sheath body 21 covers the whole area of the leading edge portion of the blade body 10 from the base end to the tip end. Moreover, in the tip end portion of the blade body 10, the bond portion 10c is formed extending from the leading edge to the trailing edge in the width direction of the blade body 10. A tip end portion 21b of the sheath body 21 is also formed extending in the width direction of the blade body 10 so as to cover the tip end portion of the blade body 10 from the leading edge to the trailing edge.

Figure 5:
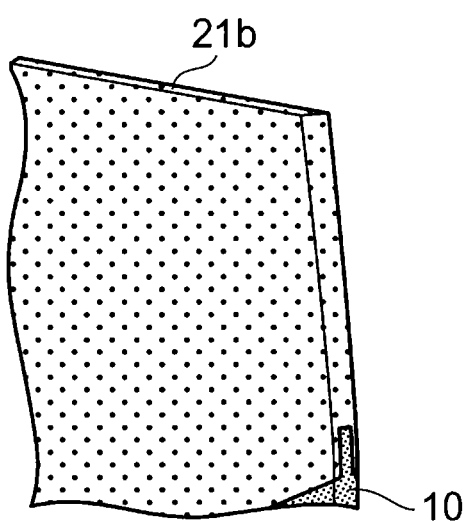
FIG. 5 is a partial magnified view of FIG. 3.

FIG. 5 is a partial magnified view of the tip end portion 21b of the fan rotor blade 1. As shown in this drawing, the tip end portion 21b of the sheath body 21 is located closer to the tip end side of the fan rotor blade 1 than the tip end of the blade body 10 is, and is thereby configured to fully cover the tip end edge of the blade body 10. Furthermore, the tip end portion 21b of the sheath body 21 extends to the trailing edge of the blade body 10 in the width direction, and maintains a dimensional relationship in which the tip end portion 21b is flush with the trailing edge of the blade body 10.

Figure 6A:
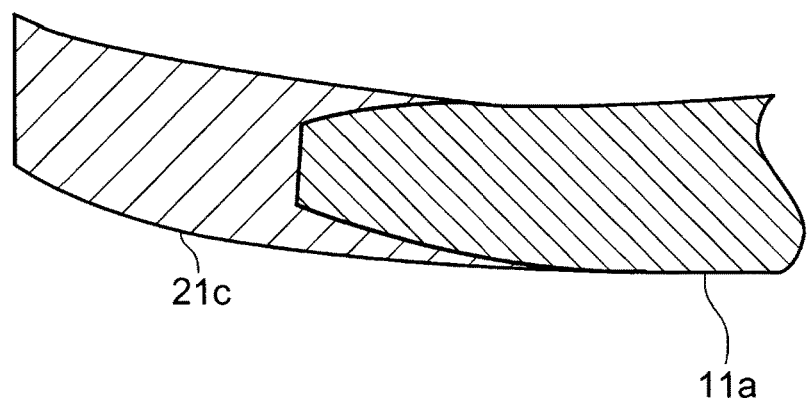
FIG. 6A is a side view and FIG. 6B is a cross-sectional view showing a blade root of the fan rotor blade.
Figure 6B:
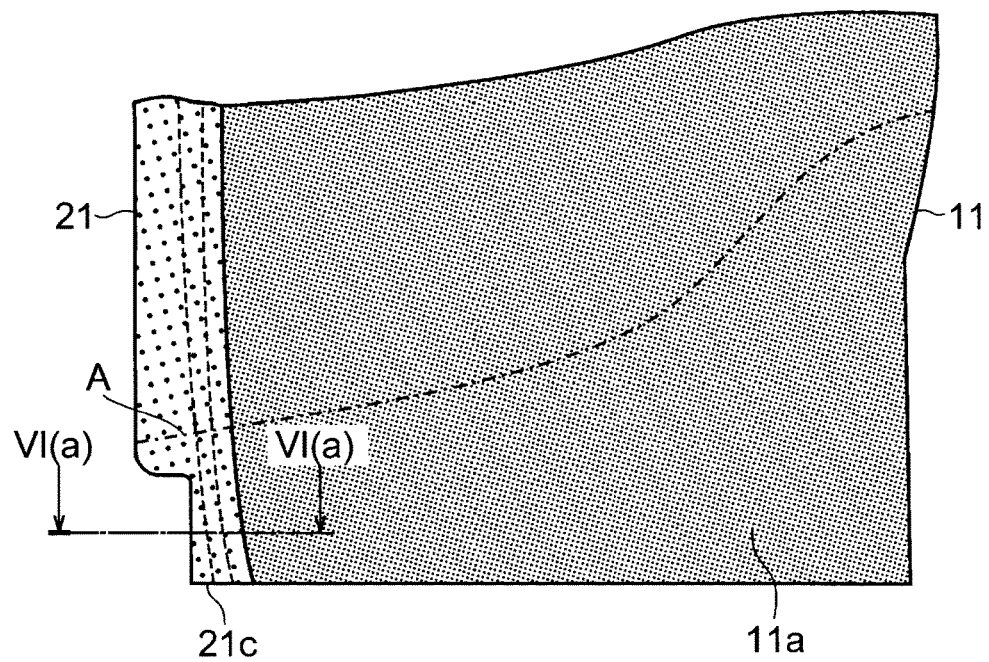

FIG. 6A is a cross-sectional view showing the blade root 11 of the fan rotor blade 1, and FIG. 6B is a side view showing the blade root 11 of the fan rotor blade 1. As described above, the bond portion 10c is continuously formed across the whole area of the blade body 10 from the base end to the tip end in the longitudinal direction, and the whole area of the leading edge portion of the blade body 10 from the base end to the tip end is covered with the sheath body 21.

In other words, a base end portion 21c of the sheath body 21 is located closer to the blade root 11, or the rotation center of the fan disk 106, than the dot-and-dash line A (the passage surface 11) is, and also covers the dovetail 11a corresponding to the base end portion of the blade body 10. In addition, since the dovetail 11a is housed in the fitting groove 106a in the fan disk 106, the base end portion 21c of the sheath body 21, integrally with the dovetail 11a, is also housed in the fitting groove 106a.

Next, descriptions will be provided for how the fan rotor blade 1 having the foregoing configuration works. Once a foreign object such as a bird or ice collides with the sheath 20, bending deformation is transmitted from the leading edge side to the trailing edge side of the fan rotor blade 1 in the width direction of the fan rotor blade 1. Generally speaking, the bending deformation transmitted from the leading edge side to the trailing edge side of the fan rotor blade 1 in the width direction of the fan rotor blade 1 is caused by a first moment in a rotation direction indicated with an arrow B in FIG. 3. Such a first moment acts on the sheath body 21 as a force which strips the sheath body 21 off the blade body 10, and an amount of bending deformation caused by this first moment is larger particularly on the tip end side of the fan rotor blade 1 which is a free end side. In addition, it has been found that the first moment on the tip end side of the fan rotor blade 1 is larger on the center side of the fan rotor blade 1 in the width direction than on the leading edge side and the trailing edge side of the fan rotor blade 1.

Figure 7A:
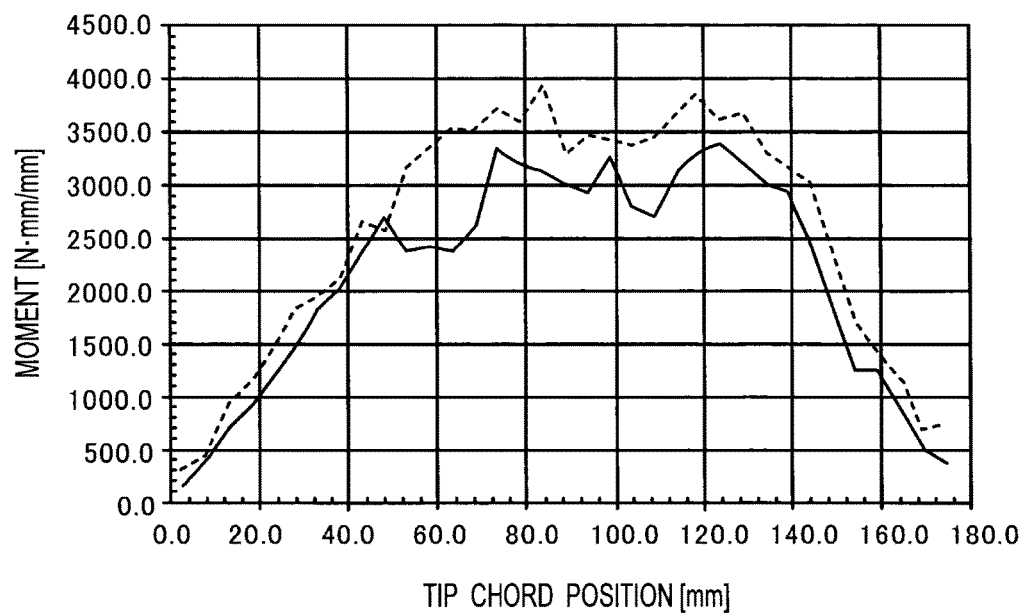
FIGS. 7A and 7B are graphs showing relations between chord positions and moments at a tip end of a general fan rotor blade.
Figure 7B:
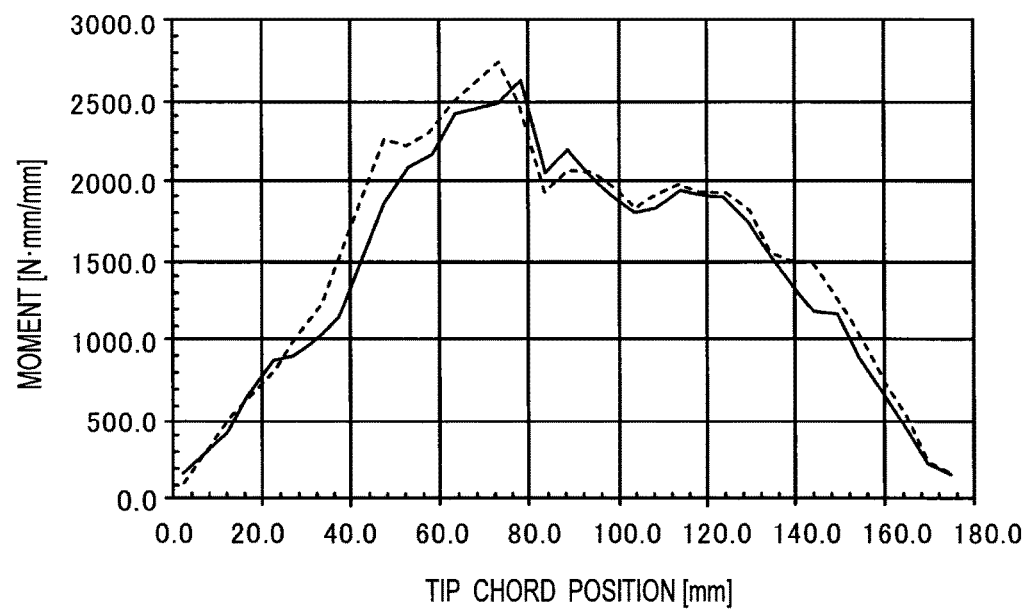

FIGS. 7A and 7B include graphs showing relations between chord positions and moments in the tip end of a general fan rotor blade. In each of the graphs, the horizontal axis indicates the chord positions (positions in the width direction of the fan rotor blade) in the tip end of the fan rotor blade, while the vertical axis indicates the moments which are produced in the tip end of the fan rotor blade when a foreign object collides with the fan rotor blade at a predetermined collision speed. Moreover, in the graphs, the solid line shows how the chord positions and the moments shift under a certain yield stress, while the broken line shows how the chord positions and the moments shift under a doubled yield stress. It should be noted that: an angle at which the foreign object collides with the fan rotor blade is different between the cases shown in FIGS. 7A and 7B; and the other conditions are the same between the cases.

As shown in these graphs, the moment produced in the tip end of the fan rotor blade by the collision of the foreign object tends to be larger on the center side of the fan rotor blade in the width direction than in the two end portions (respectively, on the leading edge side and the trailing edge side) of the fan rotor blade in the width direction. The moment is noticeable particularly in a chord position range of 40.0 to 140.0 or in an area of the fan rotor blade excluding: a range of 20% of the fan rotor blade from the leading edge; and a range of 20% of the fan rotor blade from the trailing edge.

When the sheath body 21 is fixed to the blade body 10 as described above, the continuous part between the sheath body 21 and the blade body 10, or the seam between the sheath body 21 and the blade body 10, is a part where the sheath body 21 is most likely to be separated from the blade body 10. For this reason, if the seam between the sheath body 21 and the blade body 10 where the sheath body 21 is most likely to be separated is placed in the position on which a large moment acts, there is a high risk of separation of the sheath body 21 from the blade body 10 due to the moment produced by the collision of the foreign object.

In contrast, the risk of separation of the sheath body 20 from the blade body 10 due to the collision of the foreign object can be reduced by causing the tip end portion 21b of the sheath body 21 to extended to the trailing edge of the blade body 10, and placing the seam, which is most likely to cause the separation, at a portion where the moment produced by the collision of the foreign object is relatively small, or within the range of approximately 20% of the fan rotor blade 1 from the trailing edge. Furthermore, in the embodiment, the risk of stripping off the sheath body 21 off the blade body 10 is significantly reduced since the tip end portion 21b of the sheath body 21 is flush with the trailing edge of the blade body 10. Instead, the trailing edge of the tip end portion 21b may be projected from the trailing edge of the blade body 10 toward the downstream in the direction of the intake of the external air.

In addition, as described above, when the foreign object collides with the fan rotor blade 1, the bending deformation to be transmitted from the leading edge side to the trailing edge side of the blade body 10 in the width direction of the blade body 10 is produced and the bending deformation is then transmitted from the region of the collision to the tip end side and the base end side of the blade body 10 in the longitudinal direction of the blade body 10. Generally speaking, the bending deformation transmitted in the longitudinal direction of the blade body 10 is caused by a second moment in a rotation direction indicated with an arrow C in FIG. 3. Like the first moment, such a second moment acts on the sheath body 21 as a force which strips the sheath body 21 off the blade body 10. The moment is larger on the tip end side than on the base end side.

For this reason, the risk of separation of the sheath body 21 from the blade body 10 can be reduced if, as described in the embodiment, the base end portion 21c of the sheath body 21 which is most likely to cause the separation due to the second moment is placed on the side of the blade root 11 of the blade body 10 where the amount of bending deformation is smaller. Furthermore, in the embodiment, the risk of separation of the base end portion 21c from the blade body 10 is very low since: the base end portion 21c of the sheath body 21 is extended to the dovetail 11a of the blade root 11; and the base end portion 21c of the sheath body 21 is housed in the fitting groove 106a integrally with the dovetail 11a.

As described above, the embodiment substantially reduces the risk of occurrence of the problem that the sheath 20 comes off the blade body 10 due to the collision of the foreign object, and damages other fan rotor blades 1, the engine case 103 and the like. Accordingly, the embodiment achieves a reduction in the overall weight of the fan rotor blades 1 and an improvement in the impact resistance of the fan rotor blades 1.

Referring to the accompanying drawings, the foregoing descriptions have been provided for the preferred embodiment of the present invention. However, it goes without saying that the present invention is not limited to the embodiment. It is obvious that a person skilled in the art can make various alterations and modifications within the scope defined in the claims, and it should be naturally understood that such alterations and modifications are also encompassed by the technical scope of the present invention.

What is claimed is:

1. A fan rotor blade for an aircraft jet engine configured to be fitted in a fitting groove formed in a fan disk, and to take external air into a passage formed in an engine case by rotating integrally with the fan disk, the fan rotor blade comprising:
    a blade body made from a composite material of a resin and fibers, and including a pressure surface facing one side in a rotation direction and a suction surface facing the other side in the rotation direction;
    a fitting portion provided as part of the blade body on one end side of the blade body in a longitudinal direction thereof, the fitting portion being thicker than a remaining region of the blade body and fitted into the fitting groove in the fan disk; and
    a sheath being more rigid than the blade body, and fixed to the blade body in a state where the sheath covers a leading edge portion of the blade body and the vicinity thereof, the leading edge portion being located on an upstream side in a direction of intake of the external air; wherein
    the sheath extends in the longitudinal direction of the blade body from the one end side to the other end side of the blade body in the longitudinal direction,
    a base end portion of the sheath, which is one end of the sheath in the longitudinal direction, is located closer to the one end side of the blade body than the passage formed in the engine case,
    the base end portion of the sheath extends to the fitting portion of the blade body and covers part of the fitting portion, the part including a leading end of the fitting portion,
    the base end portion is fitted into the fitting groove together with the fitting portion,
    the base end portion protrudes less than all other portions of the sheath toward the upstream side in the direction of intake of the external air.

2. The fan rotor blade for an aircraft jet engine according to claim 1, wherein the base end portion of the sheath is fitted into the fitting groove in the fan disk together with the blade body.

3. The fan rotor blade for an aircraft jet engine according to claim 2, wherein the sheath is made from a metal material.

4. The fan rotor blade for an aircraft jet engine according to claim 1, wherein the sheath is made from a metal material.

5. The fan rotor blade for an aircraft engine according to claim 1, wherein the sheath includes a tip end portion covering a tip end portion of the blade body from a leading edge of the blade body to the trailing edge of the blade body.

6. The fan rotor blade for an aircraft jet engine according to claim 5, wherein the tip end portion of the sheath body is flush with the trailing edge of the blade body.

7. The fan rotor blade for an aircraft jet engine according to claim 5, wherein the tip end portion of the sheath body is projected downstream from the trailing edge of the blade body.

8. The fan rotor blade for an aircraft jet engine according to claim 5, wherein the tip end portion of the sheath body is flush with the trailing edge of the blade body, and
    wherein the base end portion of the sheath is fitted into the fitting groove in the fan disk together with the blade body.

9. The fan rotor blade for an aircraft jet engine according to claim 5, wherein the tip end portion of the sheath body is projected downstream from the trailing edge of the blade body, and
    wherein the base end portion of the sheath is fitted into the fitting groove in the fan disk together with the blade body.

10. The fan rotor blade for an aircraft jet engine according to claim 1, wherein the fitting portion includes a dovetail and the base end portion of the sheath extends to and covers a leading edge of the dovetail.

* * * * *